United States Patent [19]
Morishima

[11] Patent Number: 6,046,857
[45] Date of Patent: Apr. 4, 2000

[54] HEAD MOUNTED IMAGE DISPLAY APPARATUS

[75] Inventor: Hideki Morishima, Kawasaki, Japan

[73] Assignee: Canon Kabushiki Kaisha, Tokyo, Japan

[21] Appl. No.: 08/777,540

[22] Filed: Dec. 30, 1996

[30] Foreign Application Priority Data

Jan. 8, 1996 [JP] Japan .................................... 8-018383

[51] Int. Cl.$^7$ .................................................. G02B 27/14
[52] U.S. Cl. ........................... 359/630; 359/434; 359/728
[58] Field of Search ..................................... 359/630, 434, 359/728

[56] References Cited

U.S. PATENT DOCUMENTS

| | | | |
|---|---|---|---|
| 5,513,041 | 4/1996 | Togino | 359/631 |
| 5,543,468 | 8/1996 | Freeman | 359/630 |
| 5,640,275 | 6/1997 | Bourguignat et al. | 359/630 |

*Primary Examiner*—Frank G. Font
*Assistant Examiner*—Reginald A. Ratliff
*Attorney, Agent, or Firm*—Morgan & Finnegan, L.L.P.

[57] ABSTRACT

This invention relates to a head mounted image display apparatus to be mounted on a head portion of an observer.

The apparatus is constructed by image generation means for displaying an image by radiating light and an optical system which has a plurality of optical elements for guiding light from said image generation means to a pupil of the observer, wherein, of said plurality of optical elements, a first decentered curved surface mirror based on an ellipsoidal surface and a second decentered curved surface mirror based on a hyperboloidal surface are arranged in turn from the pupil side of the observer, said first decentered curved surface mirror has a first focal point at a predetermined pupil position of the observer, and a second focal point at a focal point position of said second decentered curved surface mirror.

7 Claims, 3 Drawing Sheets

HEAD MOUNTED IMAGE DISPLAY APPARATUS

BACKGROUND OF THE INVENTION

1. Field of the Invention

The present invention relates to an image display apparatus and, more particularly, to an image display apparatus suitable for a so-called head mounted display (to be abbreviated as an HMD hereinafter) which is mounted on a head portion, guides a light beam including image information from an image generation means to the eyes of an observer via an optical system, and displays an image displayed on the image generation means as a virtual image.

2. Related Background Art

In one conventional HMD system, an image is displayed for the observer by directly enlarging the image on an image generation means such as a liquid crystal element (LCD), a CRT, or the like using a coaxial lens system.

Another HMD employs a decentered optical system as an optical system to increase the display field angle and to obtain a good weight balance when the HMD is mounted, and the optical system surrounds the face or head of the observer.

FIG. 3 shows an HMD disclosed in Japanese Laid-Open Patent Application No. 5-134208. In this HMD, a single decentered mirror and a relay lens system are arranged so as to surround the observer's face. Referring to FIG. 3, the HMD comprises a decentered mirror 102-1 arranged in front of a pupil 101 of the right eye of the observer, a relay lens system 102-2, and an image generation means 103 such as an LCD. In this HMD, a light beam including image information from the image generation means 103 is transmitted through the relay lens system 102-2 and reflected by the decentered mirror 102-1 to be projected onto the right eye 101 of the observer, thereby displaying an image on the image generation means 103 for the observer as a virtual image. If the decentered mirror 102-1 comprises a half mirror, the observer can observe the image on the image generation means 103 overlapping the scene of the outer field. Note that this HMD also has a portion corresponding to the left eye so that the two, right and left portions are symmetrically arranged on the right and left symmetrical surfaces of the observer's face, but such left portion is not shown in FIG. 3.

When the HMD is constituted using a coaxial lens system, the scene of the outer field cannot be displayed to overlap the image from the image generation means.

When the decentered optical system is used, a so-called see-through type display apparatus which forms an image displayed on the image generation means as a virtual image and displays it to overlap the outer field of view, can be constituted.

On the other hand, in the HMD constituted by using an odd number of decentered mirrors, the image display means is located on the face or head side of the observer. Hence, in order to locate the image display means to avoid the face and/or head of the observer, the entire HMD apparatus tends to become large.

SUMMARY OF THE INVENTION

It is an object of the present invention to provide a compact, lightweight, high-performance image observation apparatus in which an optical system is constituted by an even number of decentered curved surface mirrors, and an image display means is arranged on the side opposite to the face and/or head of the observer with respect to at least a portion of the optical system.

In order to achieve the above object, according to one aspect of the present invention, a head mounted image display apparatus comprises:

image generation means for displaying an image by radiating light; and an optical system which has a plurality of optical elements for guiding light from the image generation means to a pupil of the observer, wherein, of the plurality of optical elements, a first decentered curved surface mirror based on an ellipsoidal surface and a second decentered curved surface mirror based on a hyperboloidal surface are arranged in turn from the pupil side of the observer, the first decentered curved surface mirror has a first focal point at a predetermined pupil position of the observer, and a second focal point at a focal point position of the second decentered curved surface mirror.

According to a preferred aspect, the optical element, arranged at the first position counted from the side of the image generation means, of the plurality of optical elements comprises a third decentered curved surface mirror based on a paraboloidal surface, and a plurality of principal rays perpendicularly emanating from a display surface of the image generation means are reflected by the third decentered curved surface mirror and are then focused at a focal point of the third decentered curved surface mirror.

According to a preferred aspect, the optical element, arranged at the second position counted from the side of the image generation means, of the plurality of optical elements comprises a fourth decentered curved surface mirror, which is located at a focal point position of the third decentered curved surface mirror.

According to a preferred aspect, the fourth decentered curved surface mirror is based on a spherical surface.

According to a preferred aspect, the optical system is constituted by four decentered curved surface mirrors.

According to a preferred aspect, the four decentered curved surface mirrors are arranged in a plane in a direction with a smaller display field angle of the optical system.

The practical embodiments of the present invention will become apparent from the following description of some embodiments.

DETAILED DESCRIPTION OF THE PREFERRED EMBODIMENTS

Figure 1:
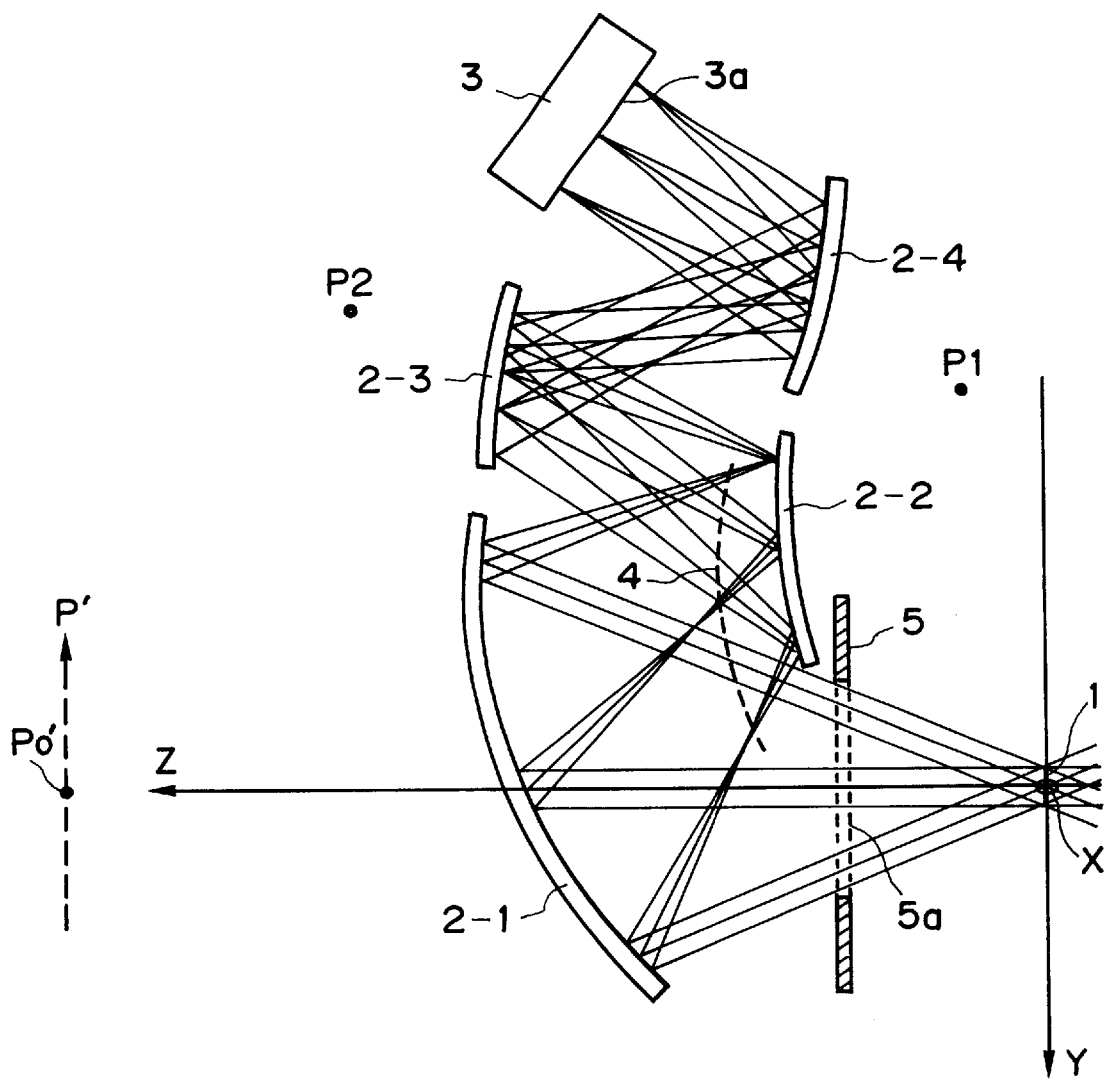
FIG. 1 is a view showing the layout of an optical system according to the first embodiment of the present invention.

FIG. 1 is a view showing the layout of an optical system according to the first embodiment of the present invention. In this embodiment, the present invention is applied to a see-through type image display apparatus which has a horizontal display field angle of 60°, a vertical display field angle of 47°, and an aspect ratio of 4:3. FIG. 1 is a vertical sectional view and also shows optical paths. FIG. 1 illustrates only a portion corresponding to the right eye of the observer. In this embodiment, such portions are symmetrically arranged on the right and left symmetrical surfaces of the face of the observer, but a portion corresponding to the left eye is not shown.

A pupil 1 of the right eye of the observer also corresponds to that of an optical system. An image display means (LCD) 3 has a display surface 3a. Light rays emanating from an image displayed on the display surface 3a are reflected by the respective decentered curved surface mirrors and reach the pupil 1 of the observer. In the following description of this specification, assume that light rays propagate from the pupil 1 toward the LCD 3 for the sake of simplicity. Decentered curved surface mirrors 2-1, 2-2, 2-3, and 2-4 constitute the optical system of the HMD and are assigned numbers in turn along the light rays from the pupil 1 of the right eye of the observer. Note that the decentered curved surface mirror 2-1 comprises a half mirror, but the other decentered curved surface mirrors comprise total reflection mirrors. In FIG. 1, a housing wall 5 that mounts the above-mentioned optical system is partially illustrated, and has a viewing window 5a, which is normally covered by a dust-proof transparent plate.

The constituting data of the first embodiment will be described below. In the following description and the constituting data, i indicates the surface number. Since this embodiment adopts a decentered system, one global coordinate system is set for the entire optical system, and local coordinate systems are set for the respective surfaces to describe the constituting data.

The origin of the global coordinate system (X, Y, Z) is set at a point where principal rays perpendicularly emanating from the respective points on the display surface 3a cross each other after they exit the optical system, i.e., at the center of the pupil of the optical system. A principal ray of a light beam which emanates from the center of the display surface 3a and exits the optical system (i.e., a light ray perpendicularly emanating from the center of the display surface 3a; to be referred to as an optical axis principal ray hereinafter) is defined as a Z-axis. Therefore, the Z-axis is a light ray which is incident from the center of the virtual image to the center of the pupil 1 of the optical system. An axis which passes the origin and makes 90° with the Z-axis in the plane of the page is defined as a Y-axis, and an axis which passes the origin and is perpendicular to the plane of the page is defined as an X-axis.

The local coordinate system (x, y, z) is present in units of surfaces, its origin is located at the vertex position of the reflection surface on the Y-Z plane, and x-, y-, and z-axes are set as follows:

z-axis: an axis which has, as an origin, a vertex point position ($Y_i$, $Z_i$) of the reflection surface, and makes a tilt angle $\theta_i$ with respect to the Z-axis direction counterclockwise in the Y-Z plane y-axis: an axis which has, as an origin, the vertex point position ($Y_i$, $Z_i$) of the reflection surface, and makes 90° with respect to the z-axis counterclockwise in the Y-Z plane x-axis: an axis which has, as an origin, the vertex point position ($Y_i$, $Z_i$) of the reflection surface and is perpendicular to the Y-Z plane Note that the tilt angle $\theta_i$ is expressed by an angle (unit: °) that assumes a positive value in the counterclockwise direction with respect to the Z-axis in the Y-Z plane. Note that each reflection surface has no tilt angles in the X-Z and X-Y planes.

The image display apparatus of the present invention has at least one reflection surface free from any rotation symmetricity, the shape of which is defined by the following formula:

$$z = \frac{(x^2+y^2)/R}{1+\{1-(1+A)^2(x^2+y^2)^2/R\}^{1/2}} + Bx^6 + Cx^4y^2 + Dx^4y + Ex^4 + Fx^2y^4 + Gx^2y^3 + Hx^2y^2 + Ix^2y + Jx^2 + Ky^6 + Ly^5 + My^4 + Ny^3 + Oy^2 + Py + Q$$

Note that the coordinate system (x, y, z) of the above curved surface formula is a local coordinate system.

Since the curved surface formula includes only terms of even-numbered orders in association with x, if the absolute value of the x-coordinate equals the y-coordinate value, the z-coordinate value assumes an identical value irrespective of the sign of the x-coordinate value. Therefore, the curved surface defined by the above curved surface formula has a plane-symmetrical shape having the Y-Z plane as a plane of symmetry.

Note that the curved surface formula is obtained by combining Zernike's polynomial expansions up to the 6th order using x and y terms in association with z.

Local Coordinate Systems of Respective Members

| Member No. | ( $Y_i$, | $Z_i$) | $\theta_i$ |
|---|---|---|---|
| 1 | ( 0.000, | 0.000) | 0.00 |
| 5a | ( 0.000, | 16.000) | 0.00 |
| 2-1 | ( 0.000, | 40.000) | 23.36 |
| 2-2 | (−30.872, | 19.962) | 5.00 |
| 2-3 | (−32.789, | 41.878) | 5.00 |
| 2-4 | (−21.317, | 25.495) | 35.00 |
| 3a | (−52.328, | 34.301) | 35.00 |

| | Surface Shape | | | |
|---|---|---|---|---|
| | Decentered Mirror 2-1 | Decentered Mirror 2-2 | Decentered Mirror 2-3 | Decentered Mirror 2-4 |
| R = | −44.6281905 | −48.7121653 | −53.0712844 | 42.3790899 |
| A = | 2.520e − 01 | −9.377e + 00 | 9.338e − 01 | −8.111e − 01 |
| B = | −3.306e − 10 | 2.290e − 08 | 6.913e − 09 | 2.283e − 09 |
| C = | −4.787e − 10 | −9.433e − 08 | −1.428e − 08 | −1.312e − 09 |
| D = | 6.479e − 10 | 1.644e − 06 | −1.995e − 07 | −2.531e − 07 |
| E = | −4.896e − 07 | 2.196e − 05 | −3.251e − 06 | −2.925e − 06 |
| F = | −5.480e − 11 | 4.933e − 08 | −1.859e − 08 | −1.103e − 08 |
| G = | 9.544e − 10 | −1.373e − 06 | 1.741e − 07 | −1.375e − 07 |
| H = | −3.441e − 07 | 2.663e − 05 | 3.558e − 06 | 7.922e − 06 |
| I = | 7.858e − 07 | −2.478e − 04 | −2.732e − 04 | 6.386e − 06 |
| J = | −1.941e − 03 | 9.675e − 03 | 8.531e − 04 | 8.325e − 04 |
| K = | 1.030e − 10 | −3.290e − 09 | 4.757e − 08 | −2.880e − 09 |
| L = | 3.185e − 10 | −9.962e − 08 | 4.482e − 07 | 1.238e − 08 |
| M = | 1.001e − 07 | 8.516e − 06 | −1.367e − 06 | 2.821e − 06 |
| N = | 7.137e − 07 | −9.480e − 05 | 6.333e − 05 | −7.020e − 05 |
| O = | −1.811e − 05 | −4.254e − 03 | 3.113e − 04 | −3.116e − 03 |
| P = | 1.498e − 02 | 8.840e − 02 | 4.571e − 02 | 1.418e − 03 |
| Q = | 4.899e − 04 | −1.360e − 03 | −2.907e − 04 | 5.706e − 04 |

In this embodiment, a light beam including image information from the LCD 3 is reflected by the decentered curved surface mirrors 2-4, 2-3, 2-2, and 2-1 in turn and is guided to the pupil of the optical system, i.e., the pupil 1 of the right eye of the observer, thereby displaying, for the observer, a virtual image P' which is an enlarged one of the image displayed on the display surface 3a. As described above, since the arrangement of this embodiment is symmetrical about the plane of symmetry of the observer s face, decentered curved surface mirrors and an LCD corresponding to the decentered curved surface mirrors 2-1, 2-2, 2-3, and 2-4 and the LCD 3 for the right eye 1 are arranged in correspondence with the left eye of the observer to be symmetrical about the plane of symmetry of the observer's face.

The arrangement of the decentered curved surface mirror will be described below. Note that a description will be made in an opposite direction, i.e., from the pupil 1 toward the LCD 3.

The decentered curved surface mirror 2-1 has an aspherical surface based on an elliptic surface, and the position of the first focal point of the elliptic surface as the base substantially matches the pupil 1 of the optical system. Also, the second focal point (a point P1 in FIG. 1) is located at a position (0, −30, 10) of the global coordinate system. The decentered mirror 2-2 has an aspherical surface based on a hyperboloidal surface, and the position of the first focal point of the hyperboloidal surface as the base substantially matches the point P1. If the total aberration of the entire system falls within an allowable range, the curved surface mirror 2-1 may have an elliptic surface. More specifically, the decentered curved surface mirror 2-1 has a curved surface based on an elliptic surface, which curved surface includes an aspherical surface based on an elliptic surface. The same applies to the decentered curved surface mirrors 2-2, 2-3, and 2-4.

When the positions and shapes of the decentered curved surface mirrors 2-1 and 2-2 are set, as described above, light beams diverging from the pupil 1 of the optical system are focused by the decentered curved surface mirror 2-1 and are guided by the decentered curved surface mirror 2-2 to the decentered curved surface mirror 2-3 without being increased in the light beam width.

Since the decentered curved surface mirror 2-2 is arranged in the vicinity of an intermediate imaging surface 4 of light beams of the respective field angles, the directions of principal rays of the light beams of the respective field angles can be controlled by the decentered curved surface mirror 2-2 without largely influencing imaging of the light beams of the respective field angles, thus correcting distortion here.

The second focal point (a point P2 in FIG. 1) of the hyperboloidal surface as the base of the decentered curved surface mirror 2-2 is located at a position (0, −42.4, 55.2) of the global coordinate system, and slightly exceeds the decentered curved surface mirror 2-3.

The decentered curved surface mirror 2-3 comprises a concave aspherical surface mirror to convert the light beams of the respective field angles, which become divergent light beams by the decentered curved surface mirrors 2-1 and 2-2, into convergent light beams. The decentered curved surface mirror 2-4, which comprises a concave aspherical surface mirror, images the light beams of the respective field angles on the LCD 3, and controls the directions of principal rays, so that the principal rays of the respective field angles are substantially perpendicularly incident on the LCD 3.

Since imaging of light beams of the respective field angles on the LCD 3 is shared by the two decentered curved surface mirrors, i the mirrors 2-3 and 2-4, an excessive increase in refractive power of each decentered curved surface mirror can be prevented, thus suppressing generation of aberrations.

In this embodiment, the optical system is constituted by four decentered curved surface mirrors, and all these decentered curved surface mirrors are arranged in planes in the vertical direction that can minimize the display field angle. For this reason, when light beams are guided along the optical system, the angle each decentered curved surface mirror and a light beam make becomes smaller than that in a case wherein the mirror is arranged in the horizontal direction with a large display field angle. With this arrangement, decentration to be generated can be minimized, and easy aberration correction is allowed as a whole. Furthermore, the image display means 3 is arranged on the side opposite to the face and head of the observer with respect to the decentered curved surface mirror 2-4, thus attaining size and weight reductions of the apparatus.

In this embodiment, a so-called field lens may be inserted immediately before the LCD 3. With this arrangement, the field lens can perpendicularly input the principal rays of light beams of the respective field angles to the LCD 3 to satisfy a so-called telecentric condition with respect to the LCD 3.

Figure 2:
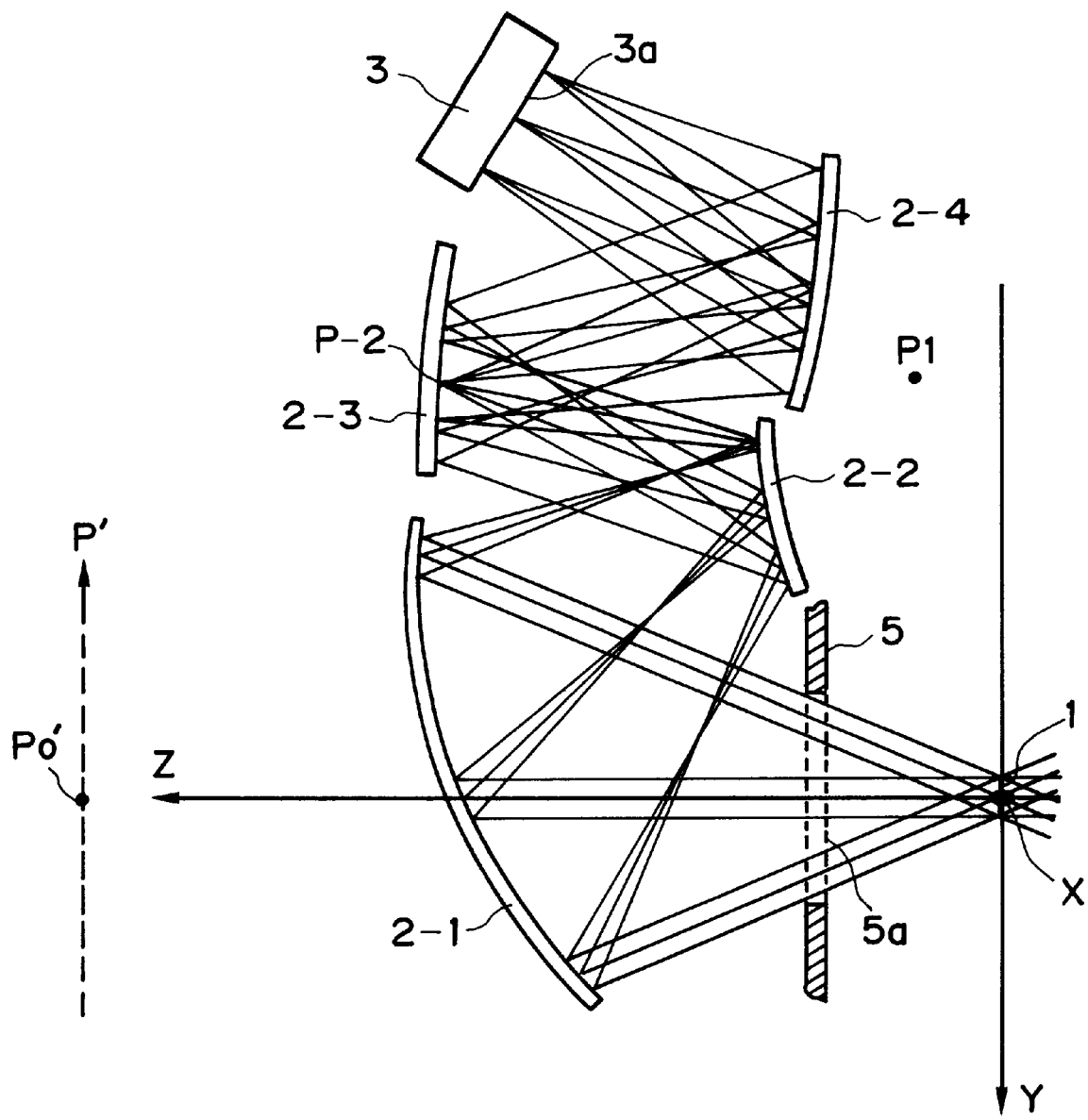
FIG. 2 is a view showing the layout of an optical system according to the second embodiment of the present invention.
Figure 3:
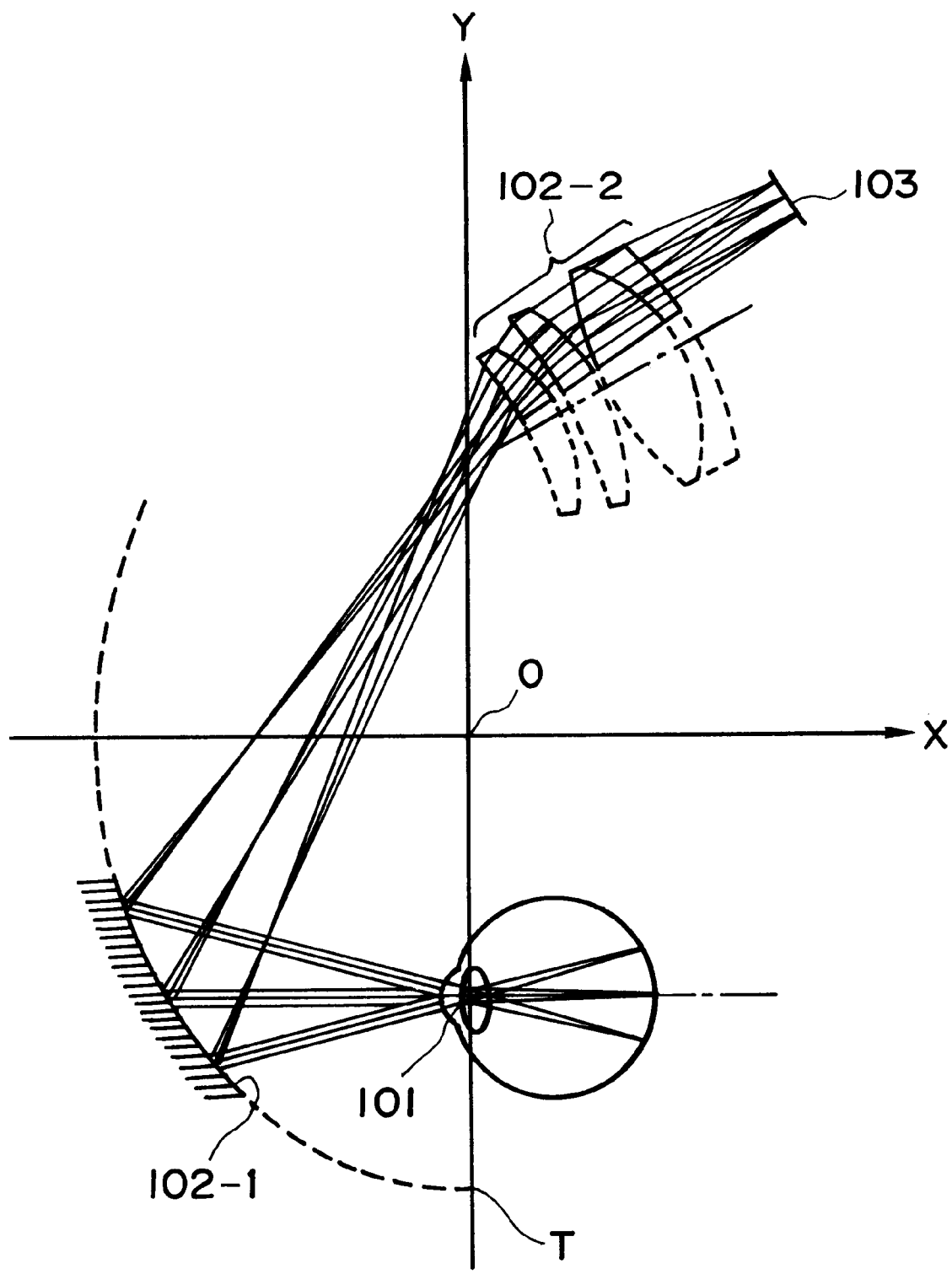
FIG. 3 is a view showing the layout of a conventional optical system.

FIG. 2 is a view showing the layout of an optical system according to the second embodiment of the present invention. In this embodiment, the present invention is applied to a see-through type image display apparatus which has a horizontal display field angle of 60°, a vertical display field angle of 47°, and an aspect ratio of 4:3. FIG. 2 is a vertical sectional view and also shows optical paths. FIG. 2 illustrates only a portion corresponding to the right eye of the observer. In this embodiment, such portions are symmetrically arranged on the right and left symmetrical surfaces of the face of the observer, but a portion corresponding to the left eye is not shown. The same reference numerals in FIG. 2 denote the same parts as in FIG. 1. A description of this embodiment will be made focusing on a portion different from the first embodiment.

The constituting data of the second embodiment are summarized below.

Local Coordinate Systems of Respective Members

| Member No. | ( $Y_i$, | $Z_i$) | $\theta_i$ |
|---|---|---|---|
| 1 | ( 0.000, | 0.000) | 0.00 |
| 5a | ( 0.000 | 14.000) | 0.00 |
| 2-1 | ( 0.000 | 40.000) | 23.36 |
| 2-2 | (−30.697, | 17.970) | 5.00 |
| 2-3 | (−32.789, | 41.878) | 0.00 |
| 2-4 | (−20.289, | 20.228) | 30.00 |
| 3a | (−56.723, | 33.833) | 30.00 |

| | Decentered Mirror 2-1 | Decentered Mirror 2-2 | Decentered Mirror 2-3 | Decentered Mirror 2-4 |
|---|---|---|---|---|
| R = | −44.6281905 | −33.9104122 | −60.8285679 | 49.6994564 |
| A = | 2.520e − 01 | −3.304e − 01 | −2.581e + 00 | −7.424e − 01 |
| B = | −3.306e − 10 | −7.739e − 08 | −1.448e − 08 | 3.701e − 10 |
| C = | −4.787e − 10 | 4.484e − 07 | 2.166e − 07 | −1.179e − 09 |
| D = | 6.479e − 10 | −3.160e − 07 | −6.214e − 08 | 7.754e − 09 |
| E = | −4.896e − 07 | −1.058e − 04 | 2.421e − 06 | 2.156e − 07 |
| F = | −5.480e − 11 | −5.306e − 07 | 1.267e − 07 | −7.645e − 09 |
| G = | 9.544e − 10 | 5.517e − 06 | −1.475e − 06 | 2.628e − 08 |
| H = | −3.441e − 07 | 1.921e − 04 | −1.137e − 05 | 3.807e − 06 |
| I = | 7.858e − 07 | −2.930e − 03 | 9.821e − 05 | 6.230e − 05 |
| J = | −1.941e − 03 | 1.857e − 02 | −1.911e − 03 | −1.637e − 03 |
| K = | 1.030e − 10 | −1.384e − 07 | −1.936e − 08 | −3.255e − 12 |
| L = | 3.185e − 10 | 1.775e − 06 | −4.292e − 07 | −8.351e − 09 |
| M = | 1.001e − 07 | 9.689e − 06 | 4.950e − 06 | −1.886e − 07 |
| N = | 7.137e − 07 | 6.738e − 04 | 3.634e − 05 | 4.004e − 05 |
| O = | −1.811e − 05 | −1.598e − 02 | 5.203e − 06 | 1.520e − 03 |
| P = | 1.498e − 02 | 3.114e − 02 | 6.631e − 02 | 7.725e − 03 |
| Q = | 4.899e − 04 | −6.434e − 04 | 4.759e − 04 | 2.915e − 05 |

In this embodiment, the decentered curved surface mirror 2-1 is the same as that in the first embodiment. The decentered curved surface mirror 2-2 has an aspherical surface based on a hyperboloidal surface, and the first focal point of the hyperboloidal surface as the base substantially matches a second focal point P1 of the elliptic surface as the base of the decentered curved surface mirror 2-1. On the other hand, a second focal point P2 of the hyperboloidal surface is located on the decentered curved surface mirror 2-3.

The decentered curved surface mirror 2-4 has an aspherical surface based on a paraboloidal surface, and the position of the focal point of the paraboloidal surface as the base substantially matches the focal point P2 on the decentered curved surface mirror 2-3.

With the above-mentioned arrangement of the optical system, an image of the pupil 1 of the optical system by the decentered curved surface mirrors 2-1, 2-2, and 2-3 is located at the point P2 on the decentered curved surface mirror 2-3, and principal rays of the respective field angles are incident on the LCD 3 as parallel rays via the decentered curved surface mirror 2-4, thus satisfying a so-called telecentric condition with respect to the LCD 3. At this time, even when the power of the decentered curved surface mirror 2-3 is changed, the telecentric condition with respect to the LCD 3 is not disturbed, and the degree of freedom in design increases. Also, since the telecentric condition with respect to the LCD 3 is not disturbed by shape errors of the decentered curved surface mirror 2-3, this arrangement is advantageous for manufacturing the mirror 2-3.

In this embodiment, the optical system is constituted by four decentered curved surface mirrors, and all these decentered curved surface mirrors are arranged in the vertical direction that can minimize the display field angle. For this reason, when light beams are guided along the optical system, the angle each decentered curved surface mirror and a light beam make becomes smaller than that in a case wherein the mirror is arranged in the horizontal direction with a large display field angle. With this arrangement, decentration to be generated can be minimized, and easy aberration correction is allowed as a whole. Furthermore, the image display means 3 is arranged on the side opposite to the face and head of the observer with respect to the decentered curved surface mirror 2-4, thus attaining size and weight reductions of the apparatus.

In this embodiment, upon constituting the HMD, the decentered curved surface mirror 2-1 may have a perfect elliptic surface, the decentered curved surface mirror 2-2 may have a perfect hyperboloidal surface, or the decentered curved surface mirror 2-4 may have a perfect paraboloidal surface.

In each embodiment of the present invention, the display surface of the image display means is arranged to face the face or head of the observer, the optical system is basically constituted by four optically continuous decentered curved surface mirrors, and the shapes and imaging relationship of the mirrors are appropriately selected, thus attaining a compact, lightweight HMD. Note that the optical system may be constituted by adding a refraction mirror or other decentered mirror to the above-mentioned four optically continuous decentered curved surface mirrors.

What is claimed is:

1. An head mounted image display apparatus to be mounted on a head portion of an observer, comprising:

image generation means for displaying an image by radiating light; and an optical system which has a plurality of optical elements for guiding light from said image generation means to a pupil of the observer, wherein, of said plurality of optical elements, a first decentered curved surface mirror based on an ellipsoidal surface and a second decentered curved surface mirror based on a hyperboloidal surface are arranged in turn from the pupil side of the observer, said first decentered curved surface mirror has a first focal point at a predetermined pupil position of the observer, and a second focal point at a focal point position of said second decentered curved surface mirror.

2. A head mounted image display apparatus to be mounted on a head portion of an observer, comprising:

image generation means for displaying an image by radiating light; and an optical system which has a plurality of optical elements for guiding light from said image generation means to a pupil of the observer;

wherein, of said plurality of optical elements, a first decentered curved surface, mirror based on an ellipsoidal surface and a second decentered curved surface mirror based on a hyperboloidal surface are arranged in turn from the pupil side of the observer, said first decentered curved surface mirror having a first focal point at a predetermined pupil position of the observer, and a second focal point at a focal point position of said second decentered curved surface mirror;

wherein the optical element, arranged at the first position counted from the side of said image generation means, of said plurality of optical elements comprises at third decentered curved surface mirror based on a paraboloidal surface, and a plurality of principal rays perpendicularly emanating from a display surface of said image generation means are reflected by said third decentered curved surface mirror and are then focused at a focal point of said third decentered curved surface mirror.

3. An apparatus according to claim 2, wherein the optical element, arranged at the second position counted from the side of said image generation means, of said plurality of optical elements comprises a fourth decentered curved surface mirror, which is located at a focal point position of said third decentered curved surface mirror.

4. An apparatus according to claim 3, wherein said fourth decentered curved surface mirror is based on a spherical surface.

5. An apparatus according to claim 1, wherein said optical system is constituted by four decentered curved surface mirrors.

6. A head mounted image display apparatus to be mounted on a head portion of an observer, comprising:

image generation means for displaying an image by radiating light; and an optical system which has a plurality of optical elements for guiding light from said image generation means to a pupil of the observer;

wherein, of said plurality of optical elements, a first decentered curved surface mirror based on an ellipsoidal surface and a second decentered curved surface mirror based on a hyperboloidal surface are arranged in turn from the pupil side of the observer, said first decentered curved surface mirror having a first focal point at a predetermined pupil position of the observer, and a second focal point at a focal point position of said second decentered curved surface mirror;

wherein said optical system is constituted by four decentered curved surface mirrors;

wherein said four decentered curved surface mirrors are arranged in a plane in a direction with a smaller display field angle of said optical system.

7. An optical system for a head mounted image display apparatus to be mounted on a head portion of an observer, comprising:

a plurality of optical members for introducing an image to a pupil of observer, said plurality of optical members having two continuous decentered mirrors, both of which are non-spherical mirrors based on two quadratic surfaces;

wherein a position of a focal point of one of said two decentered mirrors matches a position of a focal point of the other one thereof.

* * * * *

UNITED STATES PATENT AND TRADEMARK OFFICE
CERTIFICATE OF CORRECTION

PATENT NO. : 6,046,857
DATED : April 4, 2000
INVENTOR(S) : Hideki Morishima

It is certified that error appears in the above-identified patent and that said Letters Patent is hereby corrected as shown below:

Column 5,
Line 58, please delete "mirrors, i the" and insert therefor -- mirrors, i.e., the --.

Column 8, claim 2,
Line 23, please delete "surface, mirror", and insert therefor -- surface mirror --.

Signed and Sealed this

Twenty-sixth Day of March, 2002

Attest:

Attesting Officer

JAMES E. ROGAN
*Director of the United States Patent and Trademark Office*